A. J. EVERS AND H. J. SAUVAGE.
BOX SLIDE MAKING MACHINE.
APPLICATION FILED SEPT. 25, 1920.

1,381,176.

Patented June 14, 1921.
8 SHEETS—SHEET 1.

Inventors:
Arthur J. Evers
Herbert J. Sauvage
By Walter M. Fuller Atty

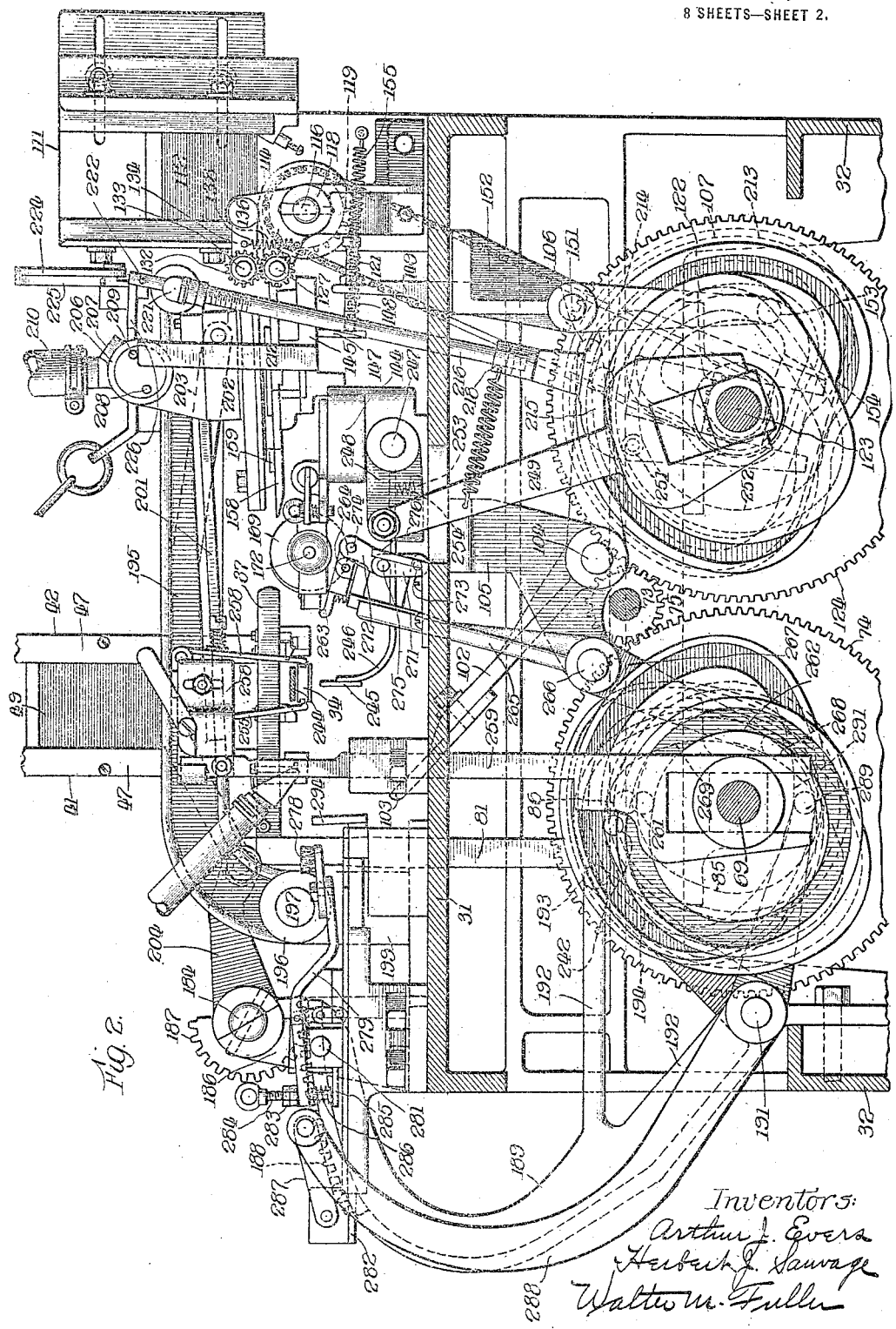

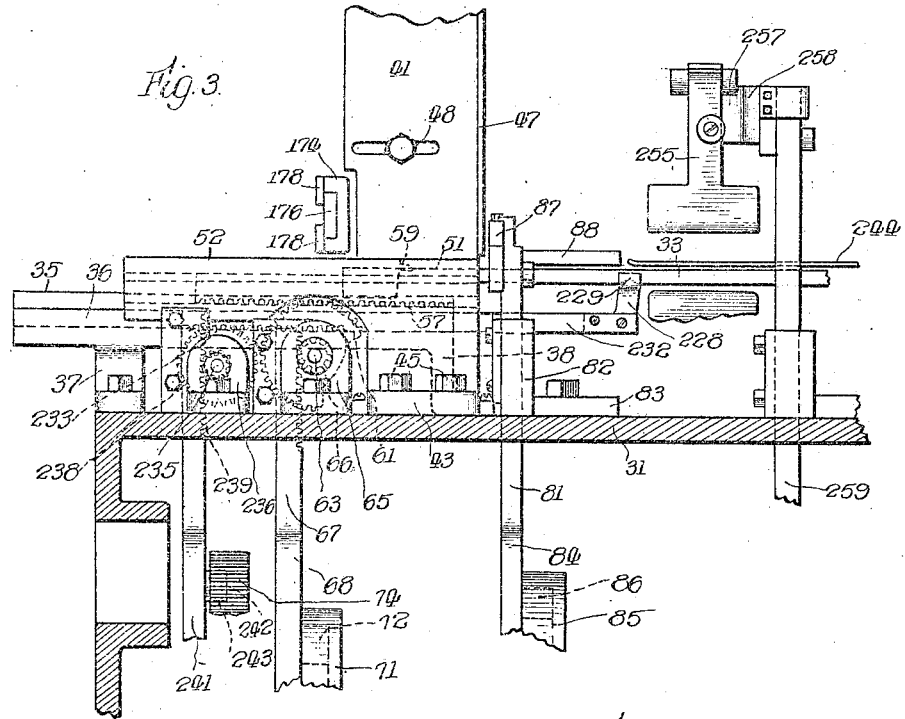
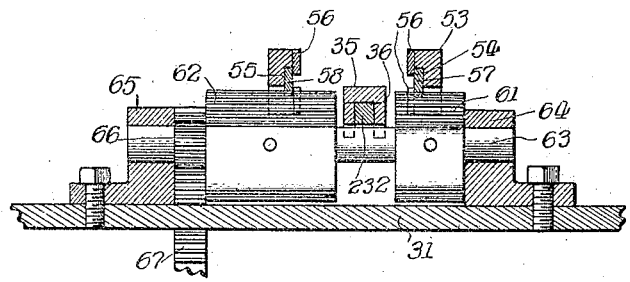
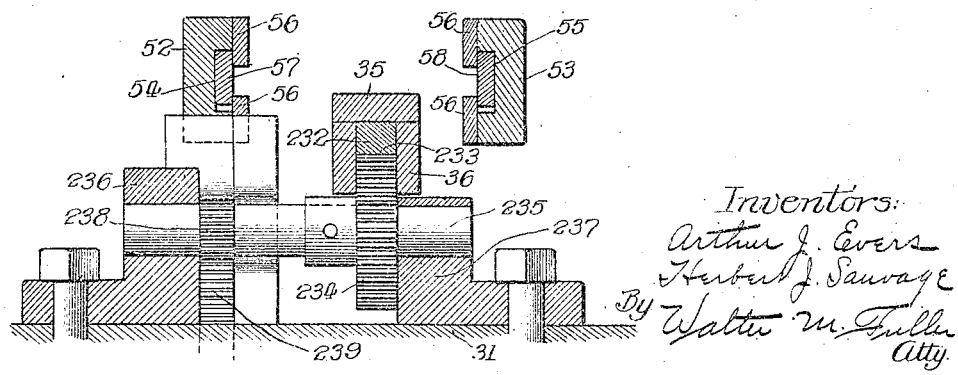

A. J. EVERS AND H. J. SAUVAGE.
BOX SLIDE MAKING MACHINE.
APPLICATION FILED SEPT. 25, 1920.
1,381,176.
Patented June 14, 1921.
8 SHEETS—SHEET 4.
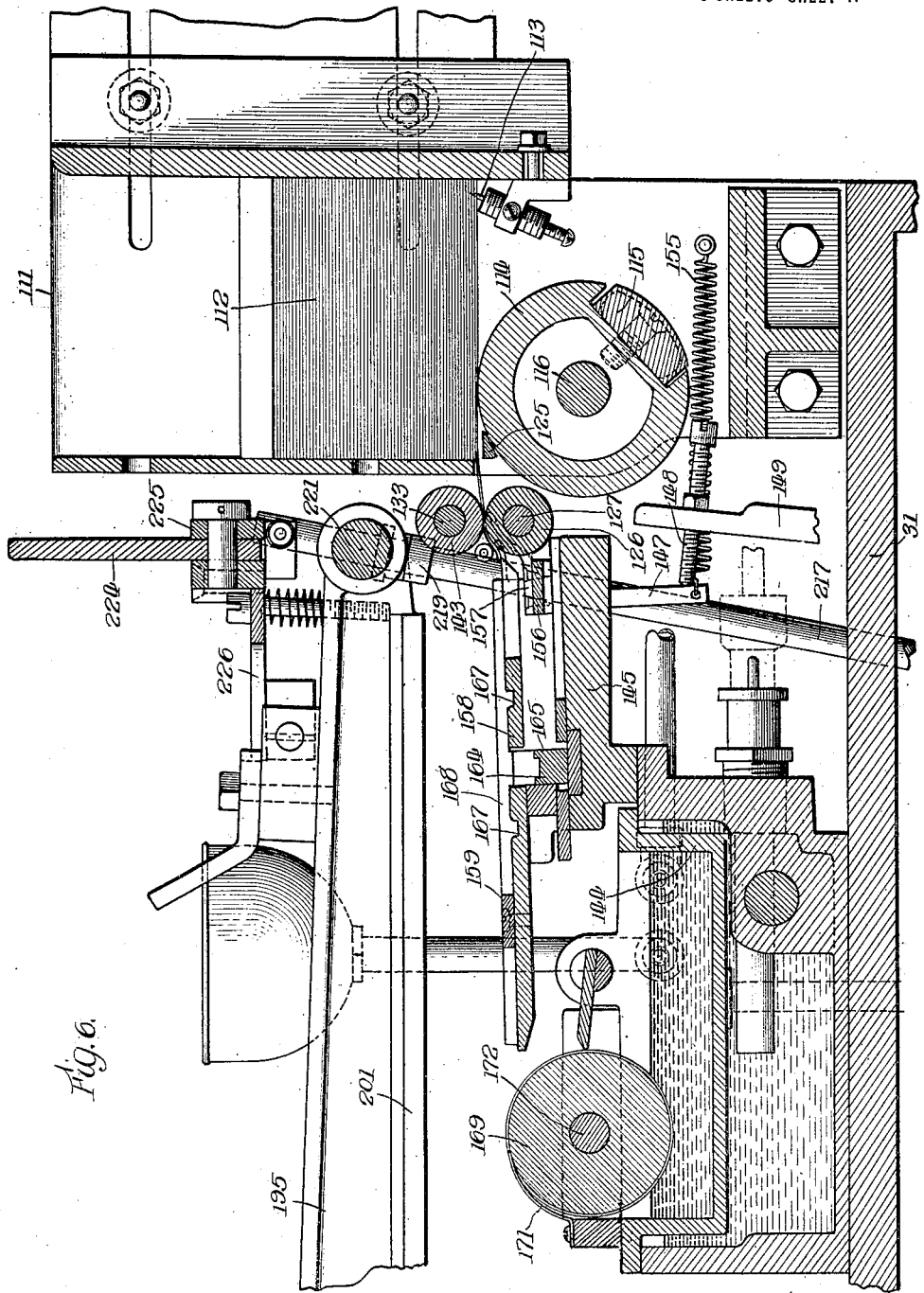

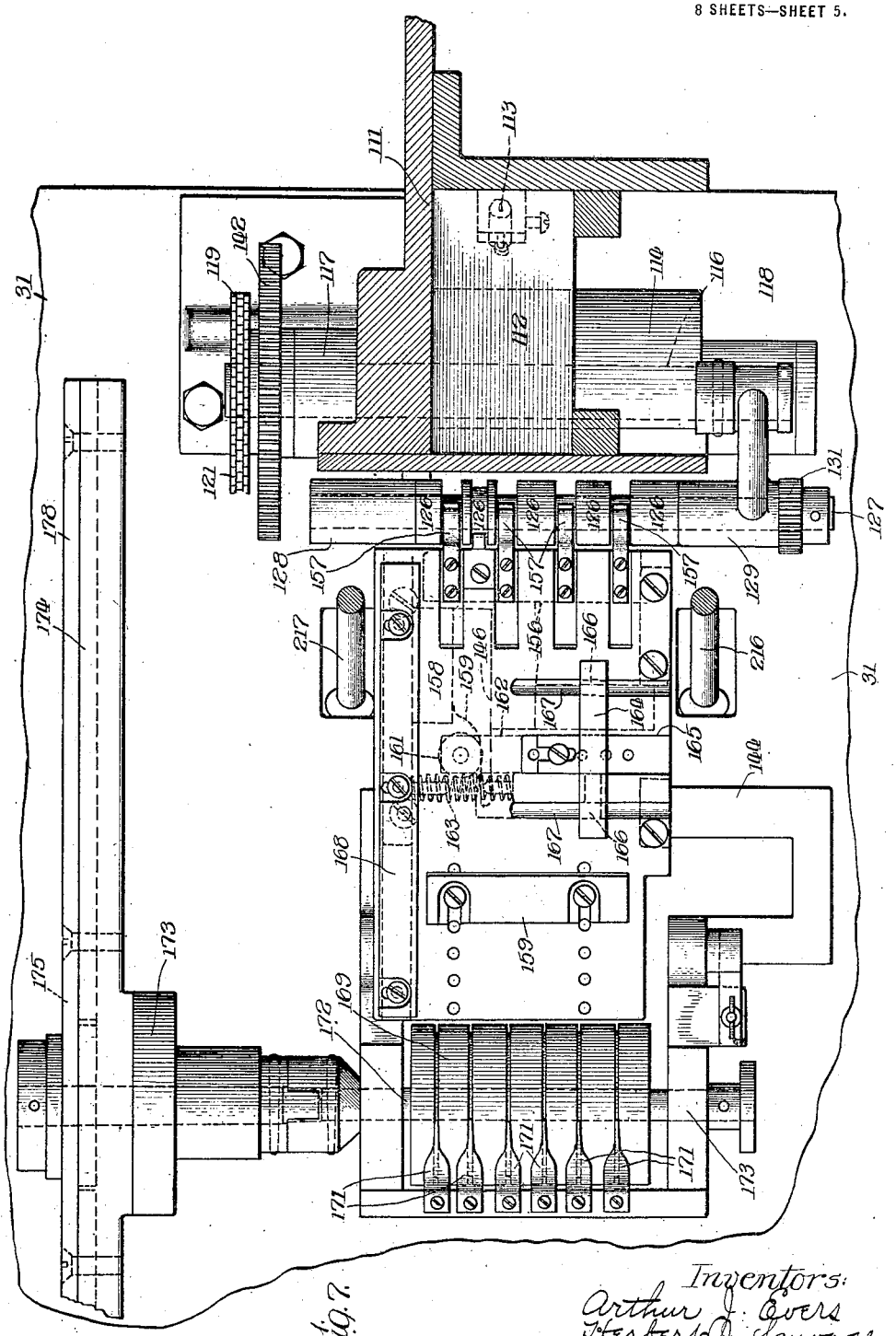

A. J. EVERS AND H. J. SAUVAGE.
BOX SLIDE MAKING MACHINE.
APPLICATION FILED SEPT. 25, 1920.
1,381,176.
Patented June 14, 1921.
8 SHEETS—SHEET 6.
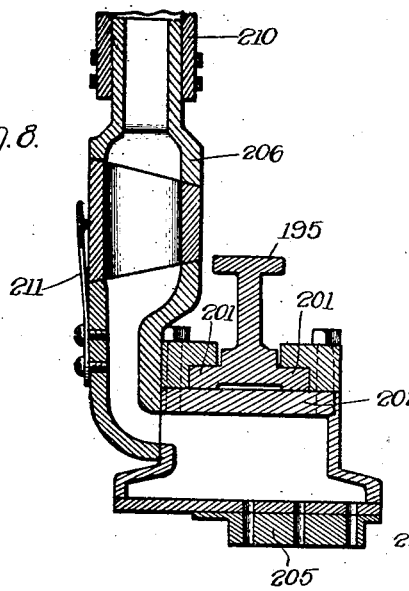
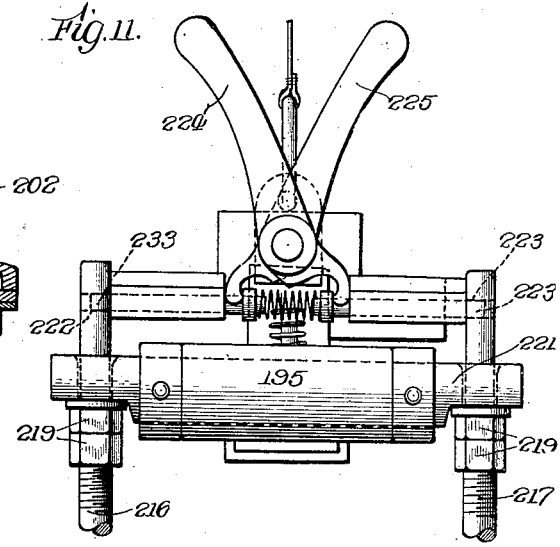
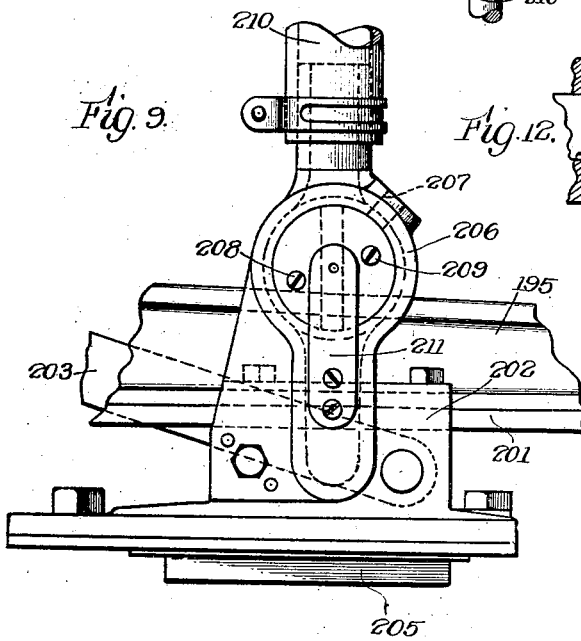
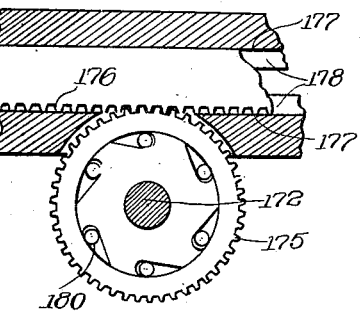
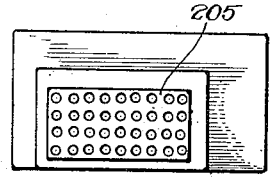
Inventors:
Arthur J. Evers
Herbert J. Sauvage
By Walter M. Fuller Atty.

A. J. EVERS AND H. J. SAUVAGE.
BOX SLIDE MAKING MACHINE.
APPLICATION FILED SEPT. 25, 1920.
1,381,176.
Patented June 14, 1921.
8 SHEETS—SHEET 8.
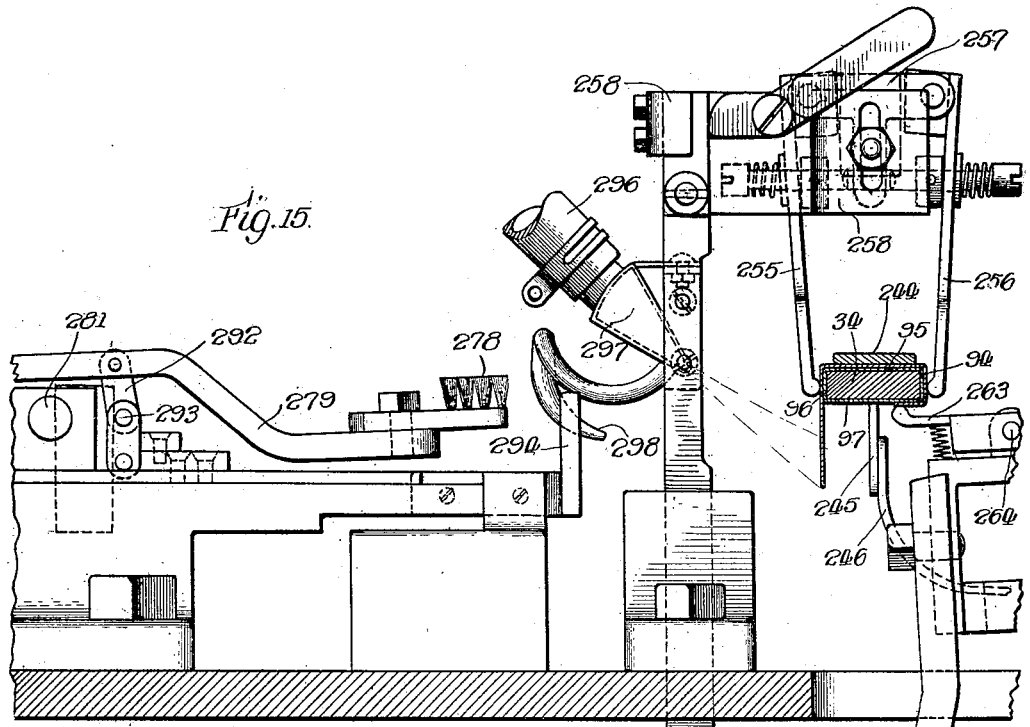
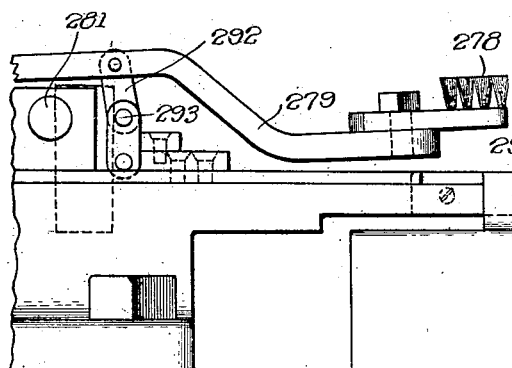
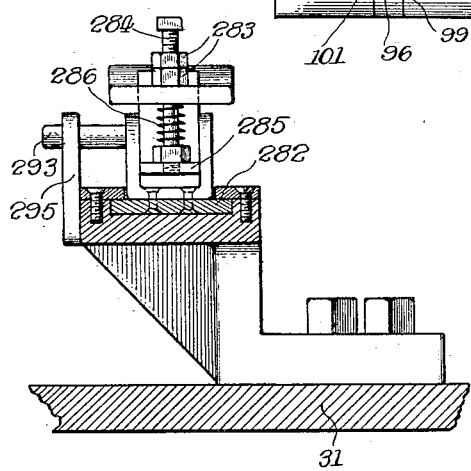
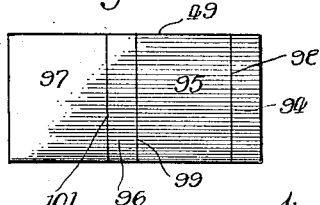
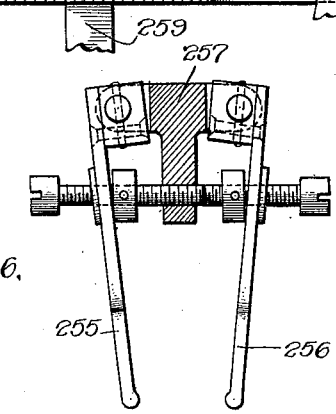
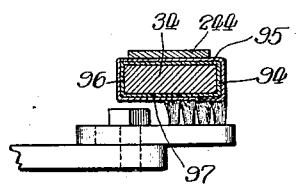

UNITED STATES PATENT OFFICE.

ARTHUR J. EVERS AND HERBERT J. SAUVAGE, OF CHICAGO, ILLINOIS, ASSIGNORS TO W. C. RITCHIE & COMPANY, OF CHICAGO, ILLINOIS, A CORPORATION OF ILLINOIS.

BOX-SLIDE-MAKING MACHINE.

1,381,176.     Specification of Letters Patent.     Patented June 14, 1921.

Application filed September 25, 1920. Serial No. 412,779.

*To all whom it may concern:*

Be it known that we, ARTHUR J. EVERS and HERBERT J. SAUVAGE, citizens of the United States, residing, respectively, at Chicago, in the county of Cook and State of Illinois, and Chicago, in the county of Cook and State of Illinois, have jointly invented certain new and useful Improvements in Box-Slide-Making Machines, of which the following is a specification.

It has been proposed, heretofore, to manufacture paper-covered pasteboard box slides or open-ended shells automatically by machine, but these have consumed the cover or finish paper from supply rolls from which suitable strips or blanks have been cut off and used. One object of the present invention is the making of such slides or shells employing a stack of flat paper blanks or labels instead of a supply-roll, whereby printed paper blanks or labels may be used.

In addition to such general difference between the new appliance and those of the prior art, the present machine has two forms, a portion of the shell or slide producing operation occurring in connection with one form, the completion of the covering or label applying function taking place in relation to the second form to which the partially-completed shell has been transferred.

In the present improved machine the flat paper labels or blanks are delivered one by one from the magazine and jogged to registration with suitable gages on a reception or transfer platform from which a suction-shoe picks up the label, wipes it over an adhesive-applying roller, and applies it to the bent pasteboard blank on one of the forms. Then, after the transfer to the second form, such paper blank or label is folded around the bent pasteboard blank and over its corner joint, the covered shell being then stripped from the form and the protruding edges of the paper, by mechanism not forming any part of this invention, are folded down into and caused to adhere to the inner faces at the two ends of the shell.

To enable those skilled in this art to have a full and complete understanding of the invention, a preferred and desirable embodiment of the same has been illustrated in the accompanying drawings forming a part of this specification and throughout the several views of which like reference characters refer to the same parts.

In the drawings:

Fig. 2 is a vertical section along the front of the appliance:

Fig. 3 is a fragmentary cross-section illustrating the pasteboard feeding and folding mechanism:

Figs. 4 and 5 are sections showing the driving gearing for the pasteboard-blank feeding appliance:

Fig. 6 is a vertical section on an enlarged scale depicting the label or cover paper feeding and adhesive-applying mechanisms:

Fig. 7 is a horizontal section through the label-magazine:

Fig. 8 is a section through the suction-shoe which transports the labels:

Fig. 9 is a fragmentary elevation of the same part of the machine:

Fig. 10 is a bottom face view of the suction-shoe:

Fig. 11 illustrates in detail the locking and operating means for the rock-arm on which the suction-shoe slides:

Fig. 12 shows in section the glue-roller actuating gearing:

Figure 13:
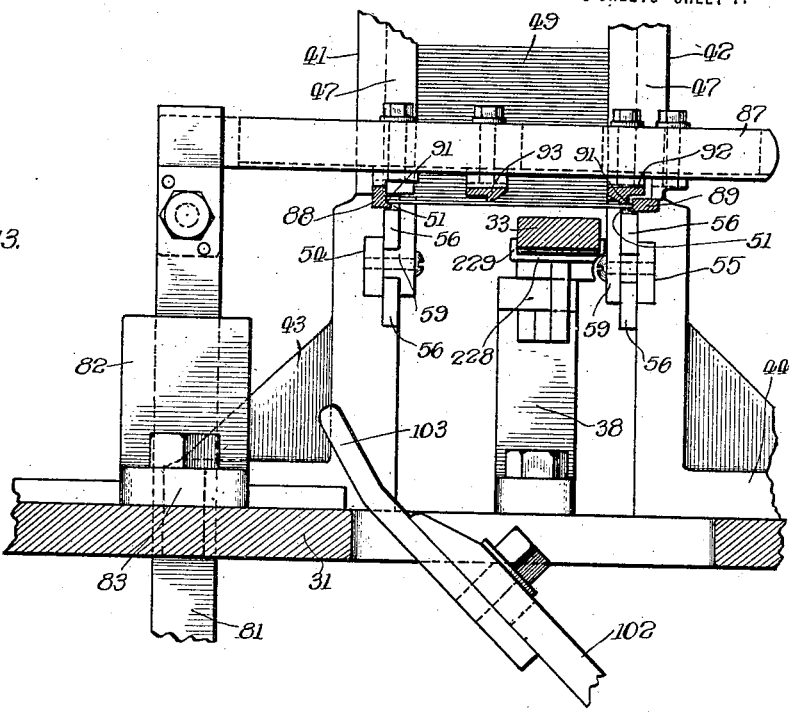
Figure 14:
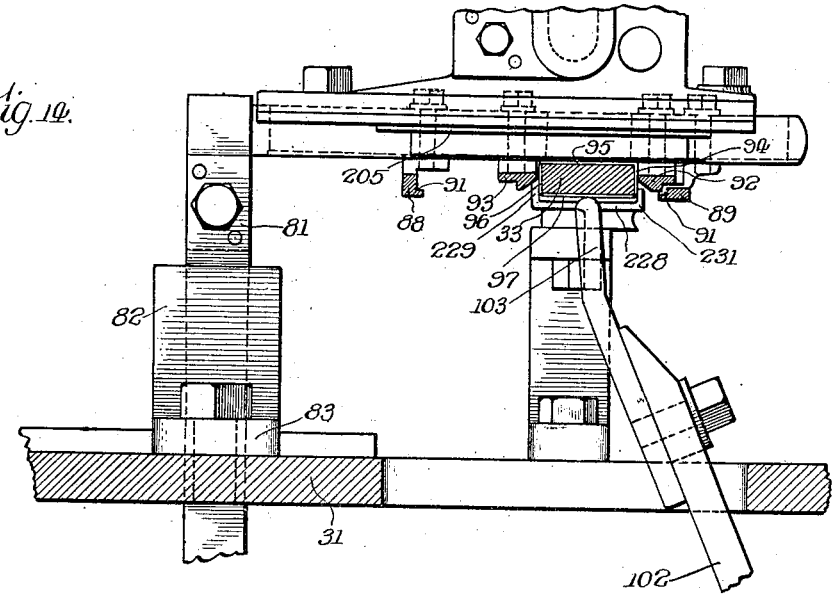

Figs. 13 and 14 indicate the mechanism for folding the pasteboard-blank around the rear form:

Figs. 15 and 16 relate to the label or cover-paper applying parts of the machine:

Fig. 17 is a vertical section at the left-hand end of Fig. 15: and

Fig. 18 is a face view of one of the pasteboard blanks.

Referring to these drawings it will be observed that the machine includes a suitably-apertured table 31 supported in the usual manner on four upright legs 32.

A stationary, horizontal, duplex form, rectangular in cross-section, having a rear part 33 and a front section 34, is mounted on and projects forwardly from a cover-plate 35 of a horizontal guide or bearing 36 having a rectangular bore and supported on the table by integral feet 37 and 38 beneath the bottom of the paste-board blank magazine.

Such magazine, located above the rear part of the rectangular form-bar 33, 34, comprises two spaced, upstanding end-walls 41 and 42 forming parts of castings 43 and 44 having feet adjustably fastened to the table top by slot and screw connections 45 and 46. Each of such magazine walls has an upright retaining strip or plate 47 secured to its front edge and on its inner face is supplied with a vertical, adjustable bar 48. The scored pasteboard blanks 49 rest in the magazine with their ends on horizontal ledges 51, 51 between such vertical retaining or guide-bars.

These two castings 43 and 44 have horizontal rearward extensions 52 and 53, which, as well as parts of the castings beneath the stack of pasteboard-blanks in the magazine, have inwardly facing grooves 54 and 55 with their inner faces partially covered by longitudinal, vertically-spaced bars 56 leaving a horizontal slot between them. These two grooves or bearings accommodate racks 57 and 58 carrying shouldered blank pushers or feeders 59, 59 adapted to engage and feed forwardly the lowermost blanks of the magazine beneath the lower ends of plates 47.

Such racks 57 and 58 are reciprocated by means of two gears 61 and 62 on a horizontal shaft 63 beneath the bearing 36 and revoluble in bearings 64 and 65 fastened to the table top. The shaft is operated to effect the movements of the blank-pushers by means of a pinion 66 secured to the shaft and in mesh with a vertically-slidable rack 67 extended up through an aperture in the table top beneath which it has a bifurcated part 68 straddling a shaft 69 revoluble in bearings on the frame and equipped with a cam 71 in the cam-groove of which a roller 72 on the forked bar travels. Thus rotation of shaft 69 reciprocates the blank pushers or feeders, the shaft being revolved from a drive-shaft 73 beneath the table top by intermeshing gears 74 and 75 secured to the two shafts, shaft 73 being driven from an electric-motor 76 by coöperating gears 77 and 78.

Turning our attention now to the means for bending or folding the blanks delivered from the magazine about the rear form or form section 33, it will be seen that a vertically-disposed bar 81, rectangular in cross-section, is slidable through an aperture in the table-top in a bearing 82 having a foot 83 secured to the top face of the table. This bar 81 has a branched lower end 84 to accommodate the shaft 69 and is operated by a cam 85 on such shaft by means of a roller 86 mounted on the part 84 and accommodated in the cam groove.

Bar 81 at its upper end has a horizontal slotted bar 87 just in front of the blank-magazine carrying two forwardly-projecting horizontal bars 88 and 89 slightly longitudinally grooved on their inner faces at 91 to receive the ends of the blank and support them as they are delivered by the pushers from the magazine.

The element 87 also carries two forwardly-extended benders or folders 92 and 93 adjustably mounted thereon and adapted during the descent of the member 87 to bend downwardly parts of the pasteboard blanks against the opposite vertical faces of the rear part or section 33 of the form.

When the pushers remove the lowermost pasteboard blank from the magazine they slide it forwardly in the then registering grooves 91 above and in proper position with relation to the back form section 33, the pushers then receding for the accomplishment of the next blank feeding operation.

Each pasteboard-blank 49 comprises four rectangular sections or parts 94, 95, 96 and 97 with scores or creases 98, 99 and 101 between them and adapted in the folded blanks to register with three of the corner edges of the form.

The blank pushers or feeders 59 deliver the blank with section 95 above and in register with the top face of the form 33 and when the bars 92 and 93 descend, the members 88 and 89 traveling downwardly at the same time, they fold the section 94 of the blank down against one vertical surface of the form and the section 96 against the opposite vertical face of the form, the part 97 projecting downwardly beyond the form as will be readily understood. To fold or bend such section 97 of the blank up against the bottom face of the form, an arm 102 carrying such a folder 103 is fulcrumed at 104 on a bracket 105 depending from the bottom section of the table top. The lower end of such arm has a roller 106 in the groove of a cam 107 on shaft 123 described hereinafter.

After the blank has been bent down against the two opposite vertical faces of the form, but before the part 97 has been bent up against its bottom face by the member 103, a flat, adhesive-coated paper or other suitable label or sheet is applied to the top surface of the part 95 of the blank and the mechanism for doing this will now be described.

At the right-hand portion of the machine there is a label-magazine 111 accommodating a vertical stack of labels 112 resting at one end on a suitably-supported needle point 113 and near the other end on a metallic roller 114 having a rubber section 115 outstanding slightly from its face.

Roller 114 is mounted on a shaft 116 revoluble in bearings 117 and 118 and is equipped at its rear end with a sprocket-wheel 119 driven by a sprocket-chain 121 coacting with a sprocket-wheel 122 on a shaft 123 revoluble in suitable bearings on the machine frame and rotated from the drive-shaft 73 by a gear 124 in mesh with the drive-shaft gear 75.

The friction created by the rubber section 115 of the roller 114 removes the lowermost label of the stack from the needle-point 113 and feeds it over a bar 125 through a delivery opening in the side of the magazine. Just outside of the discharge slit in the magazine is a groooved-roller 126 on a shaft 127 revoluble in bearings 128 and 129 of the bracket casting forming the support for the label-magazine, the shaft being rotated by a gear 131 thereon near its front end in mesh with a gear 132 on an upper feed-shaft 133 rotatable in a pair of rocker-arms 134 and 135 hinged on the bracket casting at 136 and 137 and pulled down by coil contractile springs 138 and 139. Such upper shaft 133 is revolved by a gear 141 on its rear end coacting with a larger gear 142 on shaft 116. Between its bearings shaft 133 is provided with a grooved label-feeding roller 143 cooperating with the lower feed-roller 126.

The glue-receptacle 144 mounted on the table-top has a projecting ledge or shelf 145 extending toward the label-feeding rollers and carrying a suitably-guided slide 146 having an arm 147 extended down through a slot in the shelf and adapted to be reciprocated by an adjustable screw 148 in the upper end of a lever 149 fulcrumed at 151 beneath the table-top in a bracket 152 and having at its lower end a roller 153 in the groove of a cam 154 on shaft 123. Such arm 147 is pulled to the right by a coil spring 155.

The slide 146 carries a cross-bar 156 provided with a series of spaced, bent, label-feeding fingers 157 projecting up through slots in a registration or transfer plate or platform 158 mounted on the ledge. When the label leaves the feed-rollers, the fingers formerly partly in the grooves of the under feed-roller advance the label against the adjustable front gage 159 on plate 158.

Slide 146 is provided with a cam 159 coacting with a roller 161 on the bottom face of a transverse slide 162 normally pushed forwardly by an expansion spring 163 and adapted to be retracted or moved rearwardly by the cam. Such slide 162 carries a label-registering bar 164 extended up through a slot 165 of the plate 158 and having an enlarged head with gibs 166 on its under face sliding in grooves 167 in the top surface of the plate to prevent the label from getting under such head, the latter pushing the label over against a side gage 168 on plate 158.

A grooved, glue-roller 169, provided with strippers 171 with their ends in the grooves of the roller, is mounted on a shaft 172 revoluble in a bearing 173 on a level bar 174 supported on the table top by a foot or base bolted thereto. This shaft 172 has a gear 175 meshing with a rack 176 slidable in the groove 177 of the horizontal bar and held in such bearing by retaining plates or strips 178. Between the gear 175 and the glue-roller shaft 172 a one-way clutch, or ratchet 180 is provided (see Fig. 12) so that the glue-roller may be actuated or revolved intermittently in one direction only, although the rack which effects its movements slides in opposite directions being reciprocated by a bent link 181 pivoted thereto and to an arm 182 on a sleeve 183 oscillatory on a stationary shaft 184 supported in spaced brackets 185 and 186. Such sleeve is operated or rocked by a mutilated gear 187 thereon in mesh with a sector 188 on a bent arm 189 fulcrumed at 191 on a cross-bar of the frame and having a triangular part or extension 192 equipped with a roller 193 in the groove of a cam 194 on shaft 69. Obviously the rotation of the cam effects the reciprocation of the rack by the intervening connecting mechanism, as will be readily understood.

The transporter for the label comprises a bent rock-arm 195 fulcrumed at 196 on a stationary shaft 197 mounted in standards 198 and 199 having a common base fastened to the top of the table. This oscillatory arm has longitudinal guides 201, 201, on which the block or shoe 202 slides, being reciprocated by a bent link 203 pivoted thereto and to a second arm 204 forming an integral part of sleeve 183. The rack 176 and the block 202 which constitutes a suction-shoe are therefore reciprocated in substantial synchronism.

The suction-shoe or block 202 is hollow and has a perforated rubber bottom 205, the interior of the shoe being connected to any source of suction or reduced atmospheric pressure by a hose 210 acting through a valve-casing 206 having an opening 207 to the outer air, the cylindrical barrel valve proper having two forwardly projecting pins 208 and 209 between which a leaf spring 211 presses against the flat face of the valve whereby to create sufficient friction to prevent unintentional movement thereof.

A bar 212 mounted on the ledge or shelf 145 is adjusted to engage pin 209 during descent of the shoe and break communication between the interior of the latter and the outer air, or, in other words, to subject the shoe to suction.

The guide and supporting arm 195 is raised and lowered or rocked on its fulcrum by means of a cam 213 coöperating with a roller 214 on the forked end of an upright bar 215 carrying two upstanding rods 216—217 on a cross-head 218 extending up through holes in the table top. The upper threaded end portions of these rods carry nuts 219 on which bears an apertured cross-shaft 221 rockingly mounted in a transverse bearing in the end of arm 195, the reduced upper ends of the rods extending up through the holes of such shaft. The upper projecting ends of the upright rods have holes 222 therethrough in which sliding locking pins 223 engage to lock the rods to the arms, such locking pins or bolts being releasable by handles 224 and 225. These locks or latches and their operating means are mounted on a supplemental plate 226 fastened to the end portion of the bent arm 195.

The suction-shoe picks up the registered label on the registration plate, carries it across and in contact with the then revolving glue-roller, thereby coating its bottom face with adhesive, and then applies such face to the top surface of the partially bent blank on the rear form section 33.

The oscillation of the bent arm 195 provides for the rise and descent of the suction-shoe and the link connection described causes the longitudinal travel of the latter, the glue-roller revolving at the same peripheral speed as the travel of the suction-shoe whereby there is no tendency for displacement of the label on the latter.

As soon as the suction-shoe applies these labels to the folded blanks on the form, a rising finger 227 described hereinafter engages the valve pin 208 turning the valve to terminate the suction of the shoe and permitting the atmospheric pressure to occur therein by uncovering the opening 207.

The partially-completed box-shell with the flat label adhered to and projecting beyond its top face is now ready to be slid from the rear form section 33 onto the front section 34 and this is accomplished by stripper 228 underlying the double form bar and having two upturned ends 229 and 231 adjacent to the opposite vertical faces of the form. Such stripper is mounted on the front end of a bar 232 slidable in bearing 36 and having rack teeth 233 on its bottom face in mesh with a gear 234 on a shaft 235 revoluble in bearings 236 and 237 and having another gear 238 operated by a vertical sliding rack 239 on a bifurcated bar 241 straddling shaft 69 and having a roller 242 in a cam groove 243 cut in the rear face of gear 74.

Before the bottom section or flap 97 of the bent blank on the form can spring down away from the lower face of such rear form section 33, this stripper comes under it and slides the blank and adhered label forwardly onto the front form section 34 beneath a flat leaf spring 244 suitably supported in any approved manner and spaced a short distance above the top face of the form. At this point the remainder of the label is folded around the previously bent blank.

When the stripper recedes it is necessary to provide some other means to hold the bottom flap 97 of the blank up to the form and this comprises a bar 245 on the end of a bent arm 246 rockingly mounted at 247 on a stationary shaft on which is similarly mounted an arm 248 actuated by a bifurcated bar 249 with a roller 251 in the groove of a cam 252 on shaft 123. Arm 248 has a foot or lug 253 with a yielding connection 254 with arm 246. While the bottom flap or wing of the pasteboard blank is thus held up by the bar 245 to the corresponding lower face of the form, the label is folded down against the two opposite vertical faces of the box shell by two spring-pressed folders 255 and 256 pivoted on a block 257 adjustably mounted on a support 258 carried by a vertical slide bar 259 reciprocated by a roller 261 in the groove of cam 262 on shaft 69.

Then the right-hand downward projection of the paper is folded up against the bottom of the box-shell around its corner joint by a spring-pressed folder 263 rockingly mounted at 264 on a rock-arm 265 fulcrumed beneath the table top at 266 and having a downward extension 267 actuated by a roller 268 in cam 269.

Figure 1:
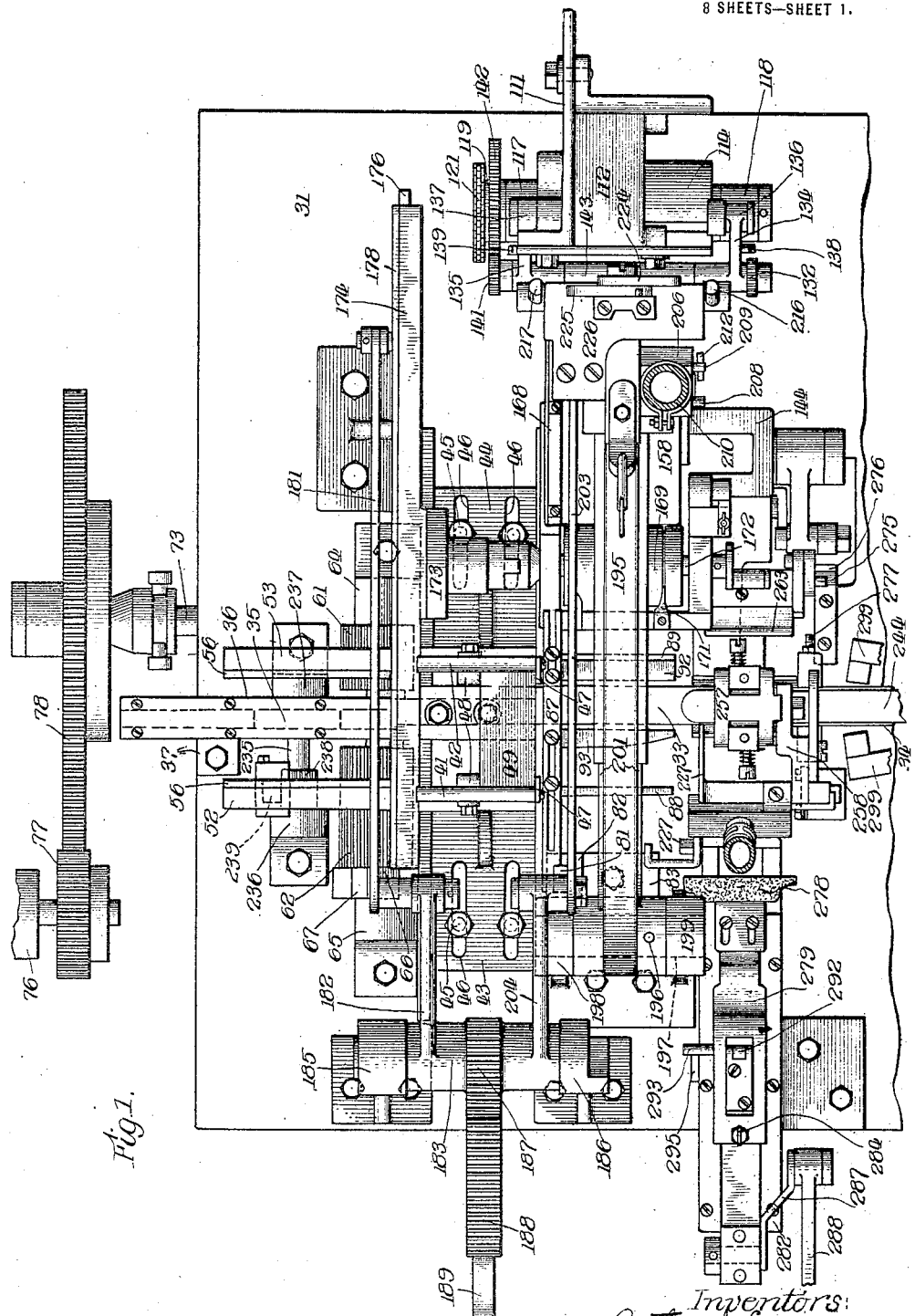
Figure 1 is a plan view of the machine.

In order to enable such member 263 to thus apply the specified portion of the paper or label and not wipe it off during the retraction of the arm, a toggle 271, 272 (Fig. 2) is employed, one link being pivoted to an extension of arm 265 at 273 and the other similarly connected at 274 to element 263. The knuckle-pin 275 of such toggle is adapted to coact with an abutment 276 (Fig. 2) and with an adjustable stop-screw 277 (Fig. 1) whereby rocking of the toggle to one side of the center by the engagement of pin 275 with element 276 maintains the active end of arm 263 elevated during the application of the label after which the pin by striking the screw rocks the toggle to the opposite side of its center and lowers the end portion of member 263 out of engagement with the applied label during its retractive movement.

It is now necessary to apply the left-hand depending label flap to the bottom of the bent pasteboard blank and to cause it to overlap the previously applied right-hand. The mechanism for doing this comprises a brush 278 adjustably mounted on a lever 279 fulcrumed at 281 in a bracket mounted on a suitably-guided sliding carriage 282, the elevation of the bracket being adjusted by means of nuts 283 on a threaded rod 284 mounted in an extension 285 of the bracket and projecting up through a hole in the lever, a coil-spring 286 being interposed between the lever and ledge 285.

The carriage or slide is reciprocated by means of a link 287 connecting it to a curved lever 288 rockingly mounted on shaft 191 and having a roller 289 coacting with cam 291 on shaft 69.

To raise and lower the lever 279 and its brush 278 so that it may apply the label flap when elevated and be lowered during its backward movement, a toggle 292 is connected at its ends to the slide or carriage and to the lever, its knuckle-pin at or near the ends of the stroke of the carriage engaging alternately the abutments 294 and 295 to collapse and straighten the toggle as is needed to change the height of the brush.

To hold such left-hand label flap down in position before it is bent up against the pasteboard and thus overcome any fanning action thereon by the moving parts of the mechanism, a compressed air pipe or hose 296 is supplied or equipped with a plurality of properly-directed nozzles 297 and 298 desirably and conveniently mounted on the slide-bar 259.

The completed duplex or paper covered shell is removed from the form 34 by contracting and expanding strippers 299 operated in proper timed relation to the action of the other parts of the mechanism by means well understood in this art and not here illustrated.

In an appliance of this character the cover paper or label may be coextensive with the length of the slide or of less width than such length but in the present instance the width of the label is greater than the length of the pasteboard slide so that when the duplex slide is removed from the form the paper extends beyond both ends and by means not illustrated and not forming a part of the present invention such protruding paper portions are folded down into the opposite mouths of the slide and caused to adhere to their inner surfaces.

We claim:

1. In a box-making machine of the character described, the combination of two forms, means to partially construct a duplex box member composed of a foundation strip and a cover strip on one of said forms, means to transfer such partially-completed member to the second form, and means to complete the construction of the member on said second form, substantially as described.

2. In a box-making machine of the character described, the combination of two forms, means to feed a foundation-blank to one of said forms, means to bend such blank about said form, means to apply a cover blank to and cause it to adhere to said bent blank, means to transfer the bent foundation element and adhered cover-blank to the second form, and means to complete the application of the cover-blank to the foundation element on said second form, substantially as described.

3. In a box-making machine of the character described, the combination of two forms, means to feed a foundation-blank to one of said forms, means to bend such blank around the form, means to apply a cover-blank to cause it to adhere to such bent blank, means to transfer the bent foundation element and its adhered cover-blank to the second form preventing such element from unbending during said transfer, means to complete the application of the cover-blank to the foundation element on the second form, and means to prevent unbending of the foundation element away from the form during such completion of application of the cover-blank, substantially as described.

4. In a box-making machine of the character described, the combination of two forms, means to feed a flat foundation-blank to one of said forms, means to bend such blank around the form, means to apply a flat cover-blank to and cause it to adhere to such bent blank in flat condition, means to transfer the bent foundation element and adhered cover-blank to the second form, and means to complete the application of the cover-blank to the foundation element on said second form, substantially as described.

5. In a box-making machine of the character described, the combination of two registered forms rectangular in cross-section, means to feed a foundation-blank to one of said forms, means to completely bend such blank about the form, means to apply a flat cover-blank to and cause it to adhere to the bent foundation element while the latter is on the form, means to transfer the bent foundation element and flat adhered cover-blank to the second form and preventing unbending of such element, means to complete the folding of the cover-blank about the foundation element on said second form, and means to strip such duplex member from said second form, substantially as described.

6. In a box-making machine of the character described, the combination of two registered forms rectangular in cross section, means to feed a foundation-blank to one of said forms, means to completely bend such blank about the form with a joint along one edge of the form, means to apply a flat cover-blank to and cause it to adhere to the bent foundation element while the latter is on the form, means to transfer the foundation element and its adhered cover-blank to the second form preventing unbending of such element during the transfer, means to complete the folding of the cover-blank about the foundation element on said second form and over its joint, and means to strip the duplex member from the form, substantially as described.

7. In a box-making machine of the character described, the combination of two registered forms rectangular in cross-section, means to feed a flat foundation-blank over the top of one of said forms, means to completely bend such blank about the form with a joint along one edge of the form, means to apply a flat cover-blank to and cause it to adhere to the top face of the bent foundation element while the latter is on the form, means to transfer the foundation element and its flat adhered cover-blank to the second form preventing unbending of such element, means to complete the folding of the cover-blank about the foundation element on said second form and over its joint, means to prevent unbending of the foundation element during such completion of application of the cover-blank, and means to strip the duplex member from the second form, substantially as described.

8. In a box-making machine of the character described, the combination of a form, means to feed a foundation-blank to said form, means to bend said blank about the form, a label-magazine, a registration-platform, front and side gages for said platform, means to feed labels individually from said magazine to said platform, means to effect the registration of the label on the platform against said gages, and means to feed the registered label from the platform and apply it to the bent blank on the form, substantially as described.

9. In a box-making machine of the character described, the combination of a form, means to feed a foundation-blank to said form, means to bend said blank about the form, a label-magazine, a registration-platform, front and side gages for said platform, means to feed labels individually from said magazine to said platform, means to effect the registration of the label on the platform with said gages, means to transport the registered label from the platform to and apply it to the bent blank on the form, and means to apply adhesive to the label during its travel from the platform to the bent blank, substantially as described.

10. In a box-making machine of the character described, the combination of a form, means to feed a foundation-blank to said form, means to bend said blank about the form, a label-magazine, a registration-platform, front and side gages for said platform, means to feed the labels individually from said magazine to said platform, means to effect the registration of the label on the platform against said gages, a suction shoe to feed the registered label from the platform and apply it to the bent blank on the form, means to actuate said suction shoe, an adhesive-applying roller with which the label contacts during its travel from the platform to the blank, and means to turn said roller with a peripheral speed substantially the same as the travel of the label, substantially as described.

11. In a box-making machine of the character described, the combination of a form, means to feed a foundation-blank to said form, means to bend said blank about the form, a label-magazine, a registration-platfrom, front and side gages for said platform, means to feed labels individually from said magazine to said platform, means to register the label on the platform with said gages, a rock-arm, means to rock said arm, a suction shoe slidable on said rock-arm, means to reciprocate said shoe on said rock-arm, said suction shoe being adapted to transfer the registered label on the platform to and apply it to the bent blank on the form, an adhesive-applying roller with which the label in its travel with the shoe contacts, and means to turn said roller at a peripheral speed the same as the travel of the label, substantially as described.

12. In a box-making machine of the character described, the combination of two forms, means to feed a foundation-blank to one of said forms, means to bend such blank about said form, a label-magazine, a registration-platform, front and side gages for said platform, means to feed labels individually from said magazine to said platform, means to effect the registration of the label on the platform against said gages, means to feed the registered label from the platform and apply it to the bent blank on the form, means to transfer the bent foundation element and adhered label to the second form, and means to complete the application of the label to the foundation element on said second form, substantially as described.

13. In a box-making machine of the character described, the combination of two forms, means to feed a foundation-blank to one of said forms, means to bend such blank about said form, a label-magazine, a registration-platform, front and side gages for said platform, means to feed labels individually from said magazine to said platform, means to effect the registration of the label on the platform against said gages, means to feed a registered label from the platform and apply it to the bent blank on the form, an adhesive-applying means with which the label contacts in its travel from the platform to the bent blank, means to transfer the bent foundation element and its adhered label to the second form, and means to complete the application of the label to the foundation element on said second form, substantially as described.

14. In a box-making machine of the character described, the combination of two registered forms rectangular in cross-section, means to feed a foundation blank to one of said forms, means to completely bend such blank about the form with a joint along one edge of the form, a label-magazine, a registration-platform, means to feed labels individually from said magazine to said platform, means to register the label on the platform with said gages, a rock-arm, means to rock said arm, a suction-shoe slidable on said rock-arm, means to reciprocate said shoe on said rock-arm, said suction-shoe being adapted to transfer the registered label on the platform to and apply it to the bent blank on the form, an adhesive-applying roller with which the label in its travel with the shoe contacts, means to turn said roller at a peripheral speed the same as the travel of the label, means to transfer the bent foundation element and adhered label to the second form, means to complete the application of the label to the foundation element on said second form, and means to strip the completed box element from said second form, substantially as described.

ARTHUR J. EVERS.
HERBERT J. SAUVAGE.